(12) United States Patent
Aske

(10) Patent No.: US 12,324,063 B2
(45) Date of Patent: Jun. 3, 2025

(54) METHOD FOR PRODUCING A HEAT MODULE

(71) Applicant: EQON AS, Stavanger (NO)

(72) Inventor: Magnar Aske, Stavanger (NO)

(73) Assignee: EQON AS, Stavanger (NO)

( * ) Notice: Subject to any disclaimer, the term of this patent is extended or adjusted under 35 U.S.C. 154(b) by 269 days.

(21) Appl. No.: 17/768,396

(22) PCT Filed: Nov. 4, 2020

(86) PCT No.: PCT/NO2020/050268
§ 371 (c)(1),
(2) Date: Apr. 12, 2022

(87) PCT Pub. No.: WO2021/091394
PCT Pub. Date: May 14, 2021

(65) Prior Publication Data
US 2024/0172333 A1 May 23, 2024

(30) Foreign Application Priority Data
Nov. 4, 2019 (NO) .................................. 20191312

(51) Int. Cl.
*H05B 3/28* (2006.01)
*F24D 13/02* (2006.01)
(52) U.S. Cl.
CPC ......... *H05B 3/28* (2013.01); *H05B 2203/017* (2013.01); *H05B 2203/026* (2013.01)
(58) Field of Classification Search
CPC ................ E04F 15/02417; E04F 15/06; E04F 2290/023; H05B 3/267; H05B 3/28; H05B 2203/026; H05B 2203/017; H05B 2203/014; F24D 13/024; Y02B 30/00
USPC ......................................................... 219/213
See application file for complete search history.

(56) References Cited

U.S. PATENT DOCUMENTS

| | | | | |
|---|---|---|---|---|
| 2,912,555 | A * | 11/1959 | Jamison ................. | H05B 3/286 219/544 |
| 3,026,234 | A * | 3/1962 | Eisler ....................... | H05B 3/26 219/544 |
| 2004/0245234 | A1* | 12/2004 | Gehring ................ | F24D 13/024 219/549 |

(Continued)

FOREIGN PATENT DOCUMENTS

| | | |
|---|---|---|
| DE | 1778570 | 3/1972 |
| EP | 0731623 | 9/1996 |

(Continued)

OTHER PUBLICATIONS

Norwegian Search Report for NO 20191312, dated Jun. 4, 2020.

(Continued)

*Primary Examiner* — Eric S Stapleton
(74) *Attorney, Agent, or Firm* — ANDRUS INTELLECTUAL PROPERTY LAW, LLP

(57) ABSTRACT

A heat module for a flooring. The heat module has a stepping plate having a first side and a second side, at least one heat element arranged along the first side of the stepping plate, and a water impermeable insulator at the first side of the stepping plate. The at least one heat element is attached to the first side of the stepping plate so that emitted heat is directly conducted to the stepping plate.

2 Claims, 5 Drawing Sheets

(56) References Cited

U.S. PATENT DOCUMENTS

| | | | | |
|---|---|---|---|---|
| 2013/0119043 A1* | 5/2013 | Consiglio | ............... | E01C 5/00 |
| | | | | 439/502 |
| 2015/0382403 A1* | 12/2015 | Philip | ................ | H05B 3/12 |
| | | | | 219/541 |
| 2017/0067653 A1* | 3/2017 | Forsbom | ............... | F24D 13/02 |
| 2019/0112767 A1* | 4/2019 | Logan | ............... | H05B 1/0227 |
| 2024/0314888 A1* | 9/2024 | Tarayre | ............... | F24D 13/024 |

FOREIGN PATENT DOCUMENTS

| | | |
|---|---|---|
| GB | 1256395 | 12/1971 |
| KR | 20100032949 | 3/2010 |
| KR | 20120034316 | 4/2012 |
| WO | 2007014340 | 2/2007 |

OTHER PUBLICATIONS

International Search Report and the Written Opinion for PCT/NO2020/050268, dated Feb. 3, 2021.
International Preliminary Report on Patentability for PCT/NO2020/050268, dated Feb. 1, 2022.

* cited by examiner

METHOD FOR PRODUCING A HEAT MODULE

CROSS-REFERENCE TO RELATED APPLICATIONS

This application is the U.S. national stage application of International Application PCT/NO2020/050268, filed Nov. 4, 2020, which international application was published on May 14, 2021, as International Publication WO 2021/091394 in the English language. The International Application claims priority of Norwegian Patent Application No. 20191312, filed Nov. 4, 2019. The international application and Norwegian application are both incorporated herein by reference, in entirety.

FIELD OF THE INVENTION

The present invention relates to a method for producing a heat module.

BACKGROUND OF THE INVENTION

A problem with prior art heat modules is the presence of air pockets in the module in which condensed water is accumulating. The accumulated water cannot be drained from the module or alternatively is difficult to drain. The accumulated water increases the risk of earth leakage between module and internal electrical components. This construction also has lower mechanical impact resistance due to stepping plate thickness only provides the load bearing, or mechanical girders are causing weight increase.

When prior art heat modules are made of massive rubber or polyurethane, this construction are causing high weight on module, and still water may ingress along power supply cable to heating cable inside.

US2004245234A1 discloses an outdoor-use heating mat system comprising at least one heating mat. The heating mat includes a base layer, a heating element, a plurality of intermediate strips, a thermal conductor layer and a traffic-exposed structural layer. Forces applied to traffic-exposed layer will be directed through intermediate strips. The thickness of the traffic-exposed layer is preferably ⅛ inch or thicker.

SUMMARY OF THE INVENTION

The invention has for its object to remedy or to reduce at least one of the drawbacks of the prior art, or at least provide a useful alternative to prior art.

This object is achieved through features, which are specified in the description below and in the claims that follow. In particular, an object of the invention is to provide an improved heat module that prevents condensed water from accumulating. A further objection of the invention is to provide an improved heat module with low weight and thickness.

The object of the invention is obtained by means of a method for producing a heat module, the method comprises the steps of:
arranging a stepping plate having a first side and a second side, and a base plate next to each other and spaced apart forming a spacing,
attaching at least one heat element along the first side of the stepping plate in the spacing, and
filling the spacing with a flowable water impermeable insulator.

The filling of the spacing is preferably realized by means of a mixing machine.

The method further comprises:
connecting the at least one heat element to a power source for heating the insulator so that the insulator is curing. The power supply is arranged outside the spacing of the heat module.

According to an embodiment of the invention, the method comprises:
providing an anti-slip layer on the second side of the stepping plate.

BRIEF DESCRIPTION OF THE DRAWINGS

In the following is described examples of preferred embodiments illustrated in the accompanying drawings, wherein.

DETAILED DESCRIPTION OF THE DRAWINGS

Figure 1:
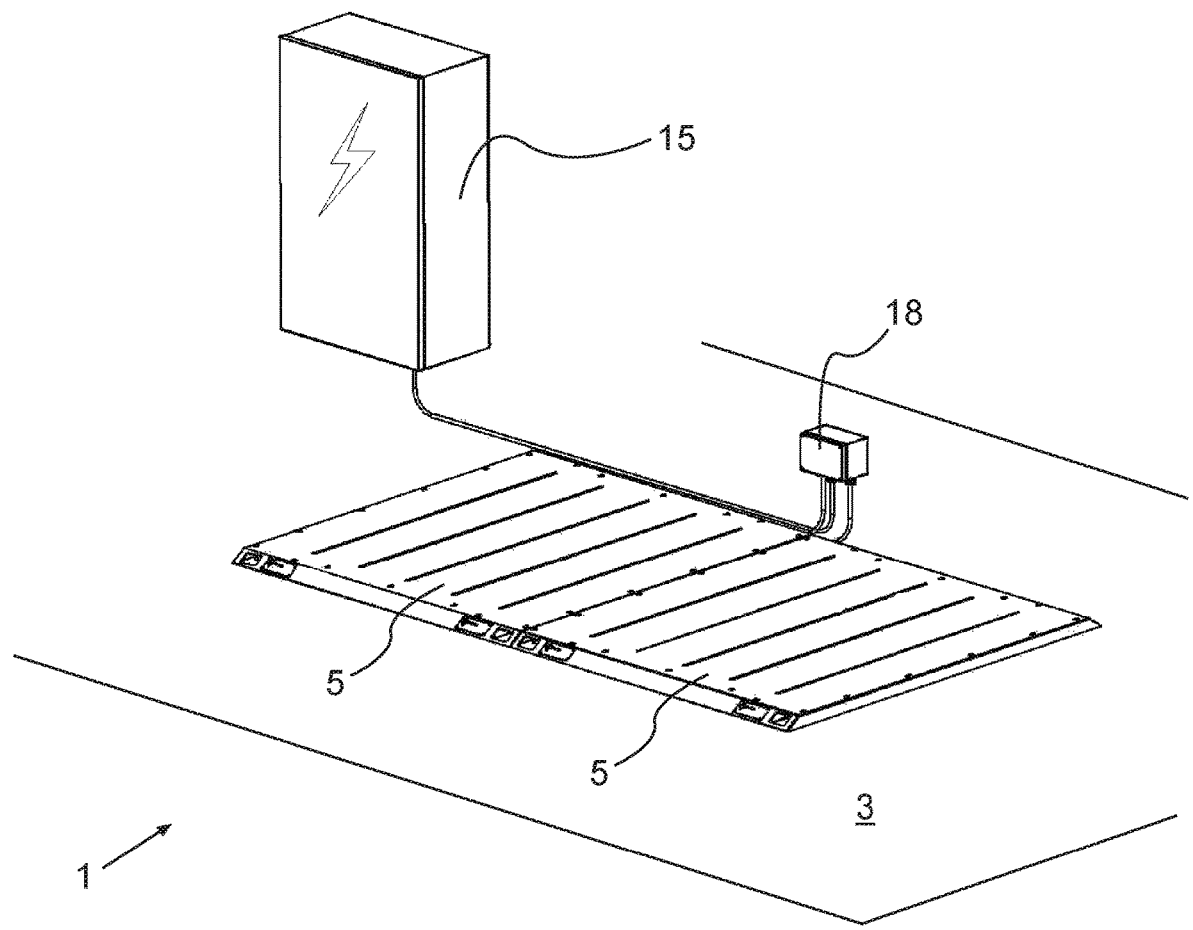
FIG. 1 discloses a heat module arrangement, wherein the heat module arrangement comprises two heat modules connected.

FIG. 1 discloses a heat module arrangement 1. The heat module arrangement 1 is configured to be arranged on or in a flooring 3. The heat module arrangement 1 comprises a heat module device comprising two or more heat modules 5, each comprising at least one heat element 10 (visible in FIG. 2), and an electric power source 15 connected to the at least one heat element 10. The heat module arrangement 1 further comprises a junction box 18 connecting the heat elements 10 of the heat modules 5. In FIG. 1 two heat modules 5 are shown. However, it shall be understood that further heat modules 5 may be connected correspondingly.

Figure 2:
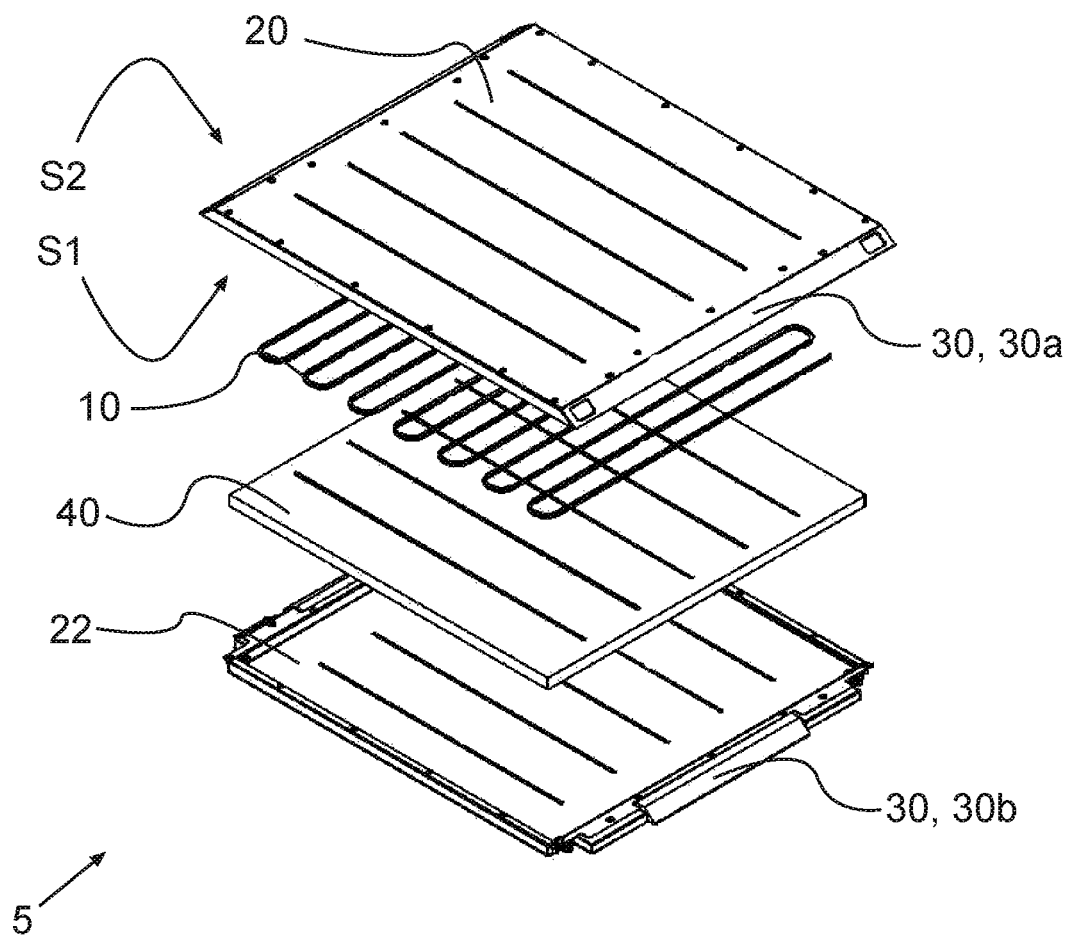
FIG. 2 discloses the heat module in FIG. 1 in an exploded view.

In FIG. 2 one of the heat modules 5 from FIG. 1 is disclosed in an exploded view. The heat module 5 comprises a stepping plate 20 and a base plate 22. The stepping plate 20 comprises a first side S1 and second side S2. The at least one heat element 10 is attached to the first side S1 of the stepping plate 20 so that the emitted heat is directly conducted to the stepping plate 20. The second side S2 of the stepping plate 20 is configured to be step on by a person.

The heat modules 5 further comprises a connection member 30 configured to connect the stepping plate 20 and the base plate 22 and hold them separated from each other, thereby forming a spacing. The connection member 30 further has the function of isolating the spacing from the surrounding environment. The connection member 30 comprises a first portion 32a at the stepping plate 20 and a second portion 32b at the base plate 22. The first portion 32a and the second portion 32b are configured to jointly connect the stepping plate 20 and the base plate 22.

The stepping plate 20 comprises an anti-slip layer at the second side S2.

The heat modules 5 in FIG. 1 further comprises a water impermeable insulator 40 arranged so that the at least one heat element 10 is isolated from the surrounding environment. The insulator 40 is for example an epoxy-foam or a polyurethane-foam. According to an embodiment, the insulator 40 is arranged filling said spacing to more than 99.5%. In addition to isolating the heat element 10 from the surrounding environment, and directing the heat to the stepping plate 20, where the insulator is epoxy-foam or polyurethane-foam, also adds significant structural strength to the heat modules 5.

The stepping plate 20 comprises for example aluminium and has a wall thickness in an interwall between 0.5 and 3 mm. Preferably, the stepping plate 20 has been processed by a rolling rib. By preparing the stepping plate 20 by means of such a rolling rib, it becomes possible to provide the stepping plate 20 with a very low thickness, considerably reducing the weight of the heat module 5.

The at least one heat element 10 is preferably attached to the stepping plate 20 by means of one of an adhesive tape, such as aluminium tape, a glue connection, such as heat transferring glue, and a bolt connection. Alternatively, the heat modules 5 comprises at least one further connection member 42 for connecting the at least one heat element 10 to the stepping plate 20. The at least one further connection member 42 is attached to the stepping plate 20 or coextruded with the stepping plate 20. See FIG. 3e.

The base plate 22 mainly comprises a rigid structural material, such as a metal plate or extruded epoxy.

The at least one heat element 10 preferably comprises an electric self-regulating heating cable. The electric self-regulating heating cable enables the temperature to be regulated to a predetermined temperature or a predetermined temperature interval. Alternatively, the at least one heat element 10 comprises an electric heating cable, a heat mat or a heating paint.

The heat module 5 comprises connection means 44, such as a bolt connection or a magnet connection, for connecting the heat module 5 to the flooring 3. Alternatively, the heat module 5 comprises one or more legs 50 for holding the heat module 5 elevated from the flooring 3.

Figure 3A:
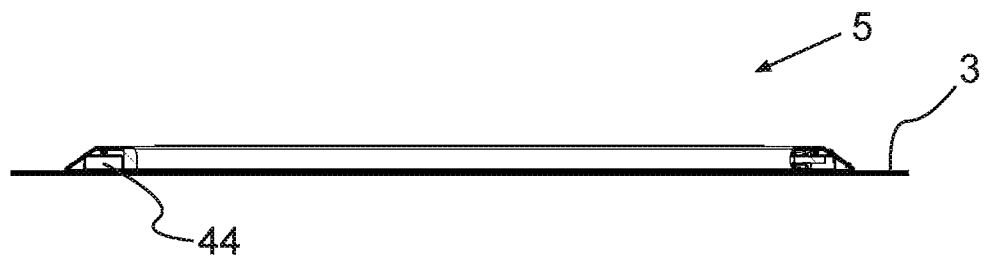
FIG. 3a discloses an arrangement of a heat module in FIG. 2.
Figure 3B:
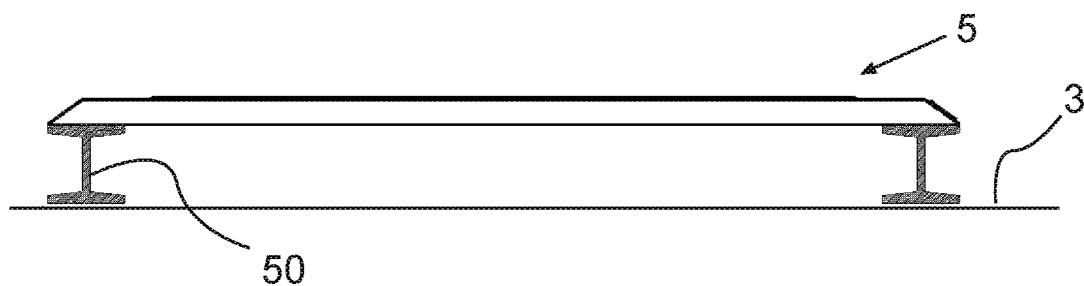
FIG. 3b discloses an arrangement of a heat module in FIG. 2.
Figure 3C:
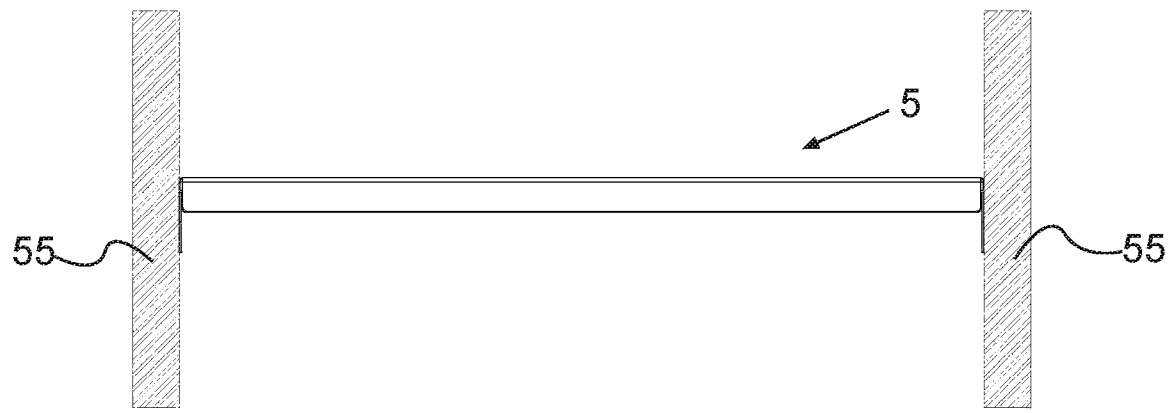
FIG. 3c discloses an arrangement of a heat module in FIG. 2.
Figure 3D:
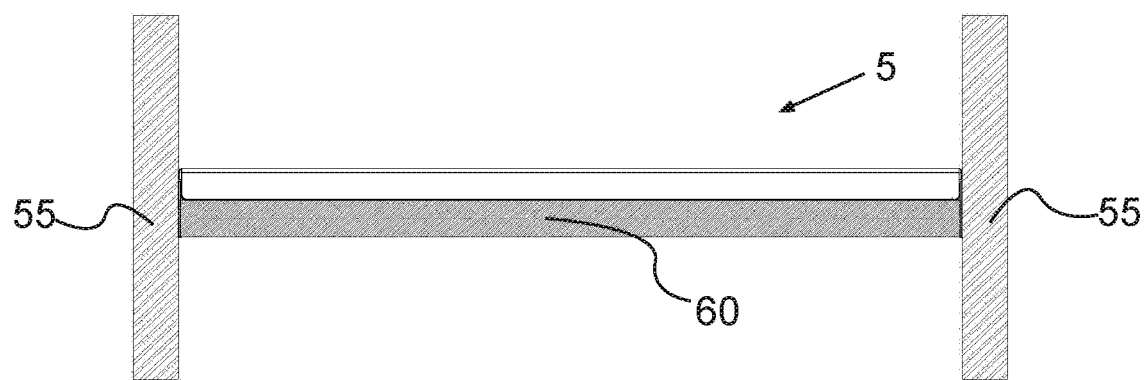
FIG. 3d discloses an arrangement of a heat module in FIG. 2.
Figure 3E:
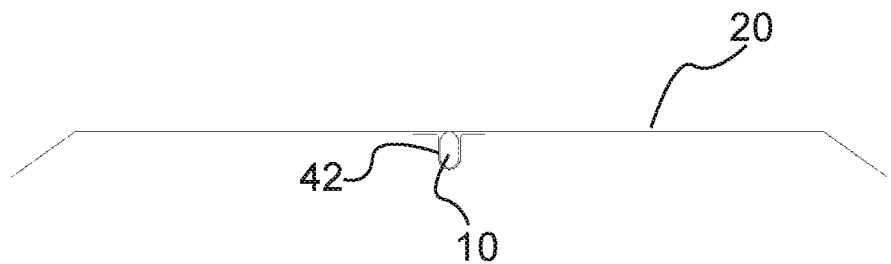
FIG. 3e discloses a further heat module in FIG. 2.

In FIG. 3a-e are different embodiments of the heat module 5 or arrangements of the heat module 5 disclosed. In FIG. 3a is the heat module 5 configured for mounting on top of a flooring 3 or a deck by connection means 44, such as by magnets, bolts or brackets. In FIG. 3b the heat module 5 is configured to be arranged elevated from the flooring 3 by means of two legs 50. In FIG. 3c is the heat module 5 configured to be arranged connected to side bearing beams 55, thereby forming self-bearing steps of a staircase. In FIG. 3d is the heat module 5 configured to be mounted on top of a step 60 of a staircase. In FIG. 3e is the stepping plate 20 and the further connection member 42 disclosed.

Figure 4:
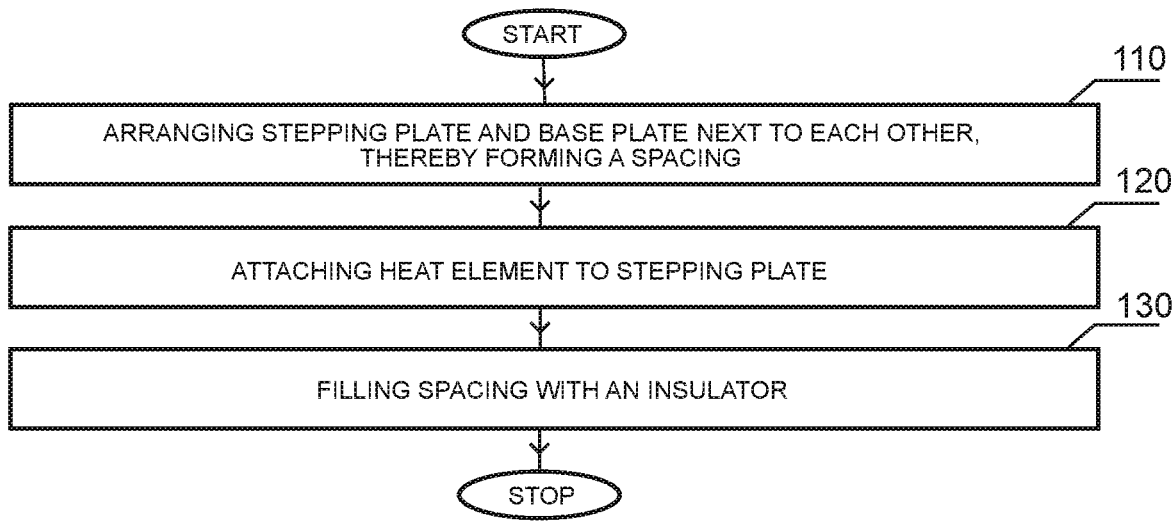
FIG. 4 discloses a method of producing a heat module.

FIG. 4 discloses a flow diagram of a method for producing a heat module 5 according to the invention. In a step 110, the method comprises arranging a stepping plate 20 having a first side S1 and a second side S2, and a base plate 22 next to each other and spaced apart forming a spacing. In a step 120, the method comprises attaching the at least one heat element 10 along the first side S1 of the stepping plate 20 in the spacing. Thereby, the emitted heat from the at least one heat element 10 is configured to be conducted directly to the stepping plate 20. In a step 130, the method comprises filling the spacing with a flowable water impermeable insulator 40, such as such as one of epoxy-foam and polyurethane-foam.

The method also comprises
connecting the at least one heat element 10 to a power source 15 for heating the insulator so that the insulator 40 is curing.

In a further alternative step, the method comprises:
providing an anti-slip layer on the second side S2 of the stepping plate 20.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. A method for producing a heat module, wherein the method comprises the steps of:
arranging a stepping plate having a first side and a second side, and a base plate next to each other and spaced apart forming a spacing,
attaching at least one heat element along the first side of the stepping plate in the spacing, and
filling the spacing with a flowable water impermeable insulator, and
connecting the at least one heat element to a power source for heating the insulator so that the insulator is curing.

2. The method according to claim 1, wherein the method further comprises:
providing an anti-slip layer on the second side of the stepping plate.

* * * * *